United States Patent
Kasapi

(10) Patent No.: US 7,961,589 B2
(45) Date of Patent: Jun. 14, 2011

(54) SYSTEM AND RELATED METHODS FOR INTRODUCING SUB-CARRIER DIVERSITY IN A WIDEBAND COMMUNICATION SYSTEM

(75) Inventor: Athanasios A. Kasapi, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 2081 days.

(21) Appl. No.: 09/967,048

(22) Filed: Sep. 28, 2001

(65) Prior Publication Data

US 2003/0064690 A1 Apr. 3, 2003

(51) Int. Cl.
*H04J 11/00* (2006.01)
(52) U.S. Cl. ........ 370/208; 370/203; 370/204; 370/343; 370/332; 370/333; 455/101; 455/103; 455/104; 455/65; 375/267
(58) Field of Classification Search ............... 455/562.1, 455/561, 101, 103, 91, 39, 65, 102, 88, 63.1, 455/276.1, 272, 27, 67.13, 67.16, 68, 67.11, 455/104, 63.2, 63.3, 63.4, 115.1, 115.2, 115.3; 375/260, 267, 299, 147, 146, 295; 343/725, 343/729, 844, 879; 370/203, 204, 206, 343, 370/332, 333
See application file for complete search history.

(56) References Cited

U.S. PATENT DOCUMENTS

| | | | | |
|---|---|---|---|---|
| 5,634,199 A | * | 5/1997 | Gerlach et al. | 455/63.1 |
| 5,652,764 A | * | 7/1997 | Kanzaki et al. | 455/101 |
| 5,912,927 A | * | 6/1999 | Smith et al. | 375/299 |
| 5,933,421 A | * | 8/1999 | Alamouti et al. | 370/330 |
| 6,249,250 B1 | * | 6/2001 | Namekata et al. | 342/372 |
| 6,266,528 B1 | | 7/2001 | Farzaneh | |
| 6,452,981 B1 | * | 9/2002 | Raleigh et al. | 375/299 |
| 6,560,209 B1 | * | 5/2003 | Alamouti et al. | 370/330 |
| 6,564,036 B1 | | 5/2003 | Kasapi et al. | |
| 6,571,081 B1 | * | 5/2003 | Reinhardt | 455/12.1 |
| 6,628,722 B1 | * | 9/2003 | Laroia et al. | 375/259 |
| 6,650,714 B2 | | 11/2003 | Dogan et al. | |
| 6,650,881 B1 | * | 11/2003 | Dogan | 455/276.1 |
| 6,697,641 B1 | * | 2/2004 | Shapira | 455/562.1 |
| 6,731,705 B2 | | 5/2004 | Kasapi et al. | |
| 6,754,467 B1 | * | 6/2004 | Ide et al. | 455/25 |
| 6,778,513 B2 | | 8/2004 | Kasapi et al. | |
| 6,785,520 B2 | * | 8/2004 | Sugar et al. | 455/101 |
| 6,865,237 B1 | * | 3/2005 | Boariu et al. | 375/295 |

(Continued)

OTHER PUBLICATIONS

Stefan Kaiser, Spatial Transmit Diversity Techniques for Broadband OFDM Systems, 2000 IEEE, pp. 1824-1828.

(Continued)

*Primary Examiner* — Ajit Patel
*Assistant Examiner* — Khai M Nguyen
(74) *Attorney, Agent, or Firm* — Blakely, Sokoloff, Taylor & Zafman LLP

(57) ABSTRACT

A system and related methods for introducing intra-channel spatial diversity within a multi-carrier wideband communication channel is presented. In accordance with one aspect of the present invention, developed more fully below, a method is presented comprising receiving information for transmission to a receiver, and generating a plurality of sub-carriers to redundantly transmit the information to a user over a multi-carrier wireless communication channel, wherein each of the sub-carriers is dynamically modified by a set of complex weights to ensure that each of the sub-carriers of the wireless communication channel propagates along a different physical path to the receiver.

20 Claims, 3 Drawing Sheets

U.S. PATENT DOCUMENTS

| | | | |
|---|---|---|---|
| 6,934,340 B1* | 8/2005 | Dollard | 375/260 |
| 6,965,774 B1 | 11/2005 | Kasapi et al. | |
| 6,985,434 B2* | 1/2006 | Wu et al. | 370/208 |
| 6,999,771 B1 | 2/2006 | Kasapi et al. | |
| 7,656,251 B1* | 2/2010 | Bauder et al. | 333/133 |
| 7,778,337 B2* | 8/2010 | Tong et al. | 375/260 |
| 2002/0034191 A1* | 3/2002 | Shattil | 370/464 |
| 2002/0166097 A1 | 11/2002 | Persson et al. | |
| 2003/0002471 A1* | 1/2003 | Crawford et al. | 370/343 |
| 2003/0053525 A1* | 3/2003 | Mehrabani et al. | 375/148 |
| 2003/0064690 A1 | 4/2003 | Kasapi et al. | |
| 2003/0064753 A1 | 4/2003 | Kasapi et al. | |
| 2003/0081656 A1* | 5/2003 | Buehrer et al. | 375/142 |
| 2003/0147655 A1* | 8/2003 | Shattil | 398/182 |
| 2004/0141548 A1* | 7/2004 | Shattil | 375/146 |

OTHER PUBLICATIONS

"802.16e™, Part 16: Air Interface for Fixed and Mobile Broadband Wireless Access Statements", Sections 6, 7, and 8, See in particular subchapters 6.1, 6A, 7.1, 7.2, 8.4 and 8.4.8,(Feb. 28, 2006),17-650.

TS 25.214 V1.0.0, UTRA FDD; Physical Layer Procedures,(Apr. 1999), 31 pages.

* cited by examiner

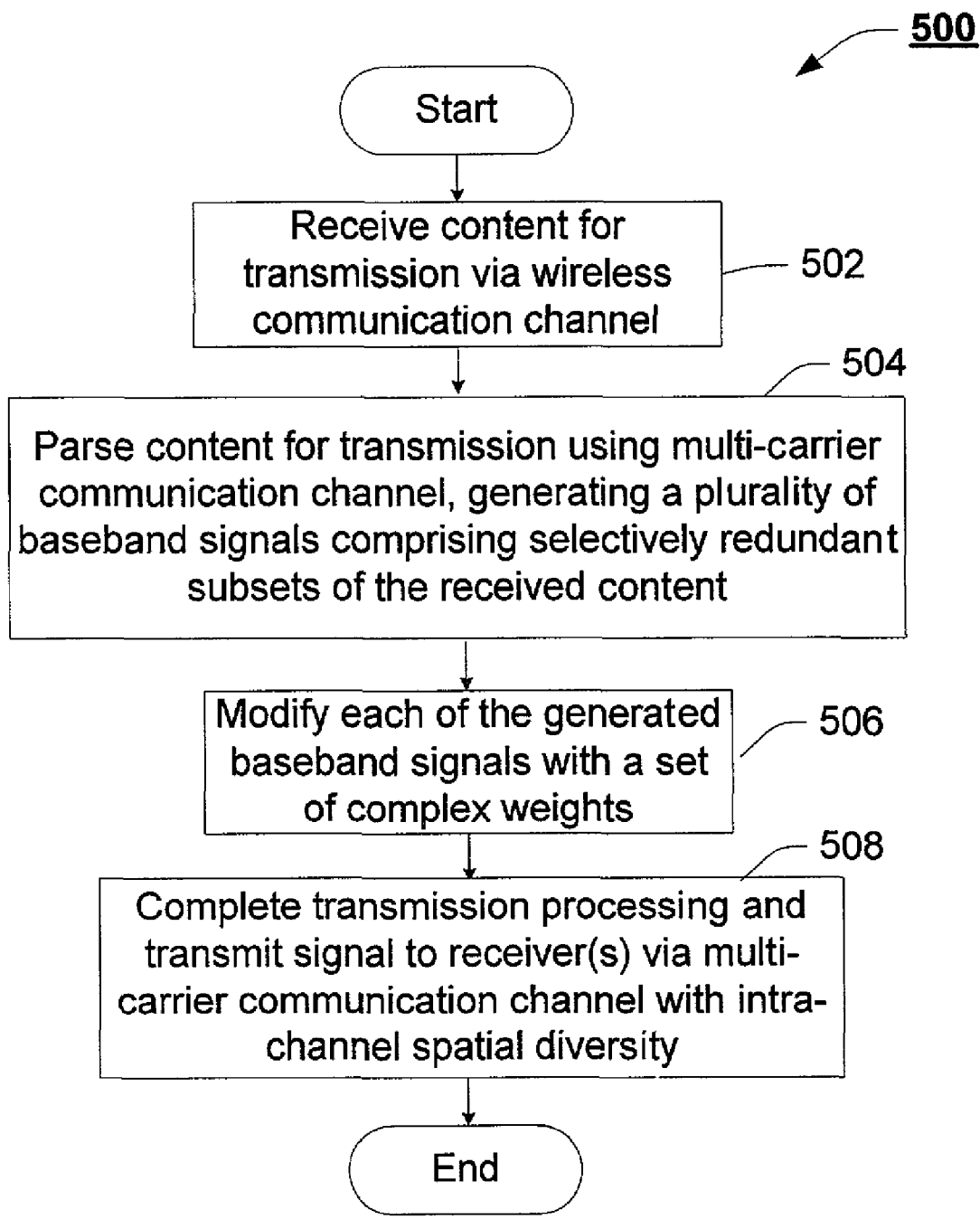

SYSTEM AND RELATED METHODS FOR INTRODUCING SUB-CARRIER DIVERSITY IN A WIDEBAND COMMUNICATION SYSTEM

TECHNICAL FIELD

The present invention generally relates to the field of wireless communication systems and, more particularly, to a system and related methods for introducing sub-carrier diversity in a wideband communication system.

BACKGROUND

The concept of broadband (or, wideband) communication is well-known. Simplistically, broadband communication techniques attempt to reduce the impact of fading by communicating information over a wideband channel employing convolutional coding and interleaving to redundantly distribute the information across the wideband channel. The phenomenon of frequency-selective fading of radio signals is a well-known obstacle to reliable wireless communication. Since fading is frequency sensitive, spreading a channel across a number of frequencies reduces the likelihood that the entire channel will suffer from the fading, and increases the likelihood of that enough of a signal is received at the receiver to reconstitute a substantial representation of the transmitted signal.

One example of a broadband communication technique employs Orthogonal Frequency Division Multiplexing (OFDM) digital modulation. OFDM describes a general class of digital modulation techniques where a set of equally spaced, phase synchronous sub-carriers are independently modulated with relatively low-rate user data in order to create a high-rate modulated waveform which can be demodulated by means of a fast-Fourier transform and sub-carrier phase detection.

OFDM is employed in several broadband applications including, for example, Digital Subscriber Line (xDSL) applications as well as the emerging wireless Ethernet standard IEEE 802.11a (IEEE Standard No: 802.11A-1999, ISBN:0-7381-1810-9), incorporated herein for all purposes. Digital signals transmitted according to the 802.11a standard undergo convolutional coding, interleaving and distribution among the sub-channels. The redundancy and decorrelation of errors provided by the coding, interleaving and distribution effectively provides a signal that is robust against frequency-selective fading as it propagates through the channel. If, as can often be the case, certain of the sub-carriers are impaired by frequency selective fading, it is hoped that enough of the sub-carriers remain unimpaired such that most of the original signal is recovered at the receiver.

In order for this process to be successful however, it is necessary that the fading is sufficiently frequency selective, and that not all (or a large fraction) of the sub-carriers become simultaneously faded. If such a situation were to arise, even the redundant bits may be lost, causing irreparable data loss. In this regard, wideband communication systems such as the OFDM system introduced above, operate best when fading of each sub-carrier is decorrelated from the fading of other sub-carriers. The difficulty in arranging for such decorrelation between the sub-carriers of the wideband communication channel contributes to the lack of widespread adoption of this standard.

Thus, a means for improving the ability of a wideband communication signal to withstand less than ideal channel conditions is required, unencumbered by the limitations commonly associated with conventional communication techniques. More particularly, a system and related methods for introducing sub-carrier diversity in a wideband communication system is required.

SUMMARY

A system and related methods for introducing spatial diversity within a broadband communication channel is presented. In accordance with one aspect of the present invention, developed more fully below, a method is presented comprising receiving information for transmission to a receiver, and generating a plurality of sub-carriers to redundantly transmit the information to a user over a multi-carrier wireless communication channel, wherein each of the sub-carriers is dynamically modified by a set of complex weights to ensure that each of the sub-carriers of the wireless communication channel propagates along a different physical path to the receiver.

BRIEF DESCRIPTION OF THE DRAWINGS

The present invention is illustrated by way of example, and not by way of limitation, in the figures of the accompanying drawings in which like reference numerals refer to similar elements and in which:

FIG. 5 is flow chart of an example method of introducing intra-channel spatial diversity, in accordance with the teachings of the present invention.

DETAILED DESCRIPTION

The present invention is generally directed to a system and related methods for introducing intra-channel spatial diversity in a wideband wireless communication channel. In accordance with one embodiment of the present invention, a sub-carrier diversity agent is introduced. As will be developed more fully below, the sub-carrier diversity agent receives one or more signals associated with a corresponding number of sub-carriers, and develops transmit weight(s) that modify one or more characteristics of the sub-carriers to introduce spatial diversity between the sub-carriers of a multi-carrier communication channel. More particularly, sub-carrier diversity agent develops a vector of complex-value weights ($w_1$, $w_2$, ..., $w_N$) to describe the at least the relative amplitude and phase characteristics imposed on a sub-carrier sent to each transmit antenna (1-N) within an antenna array. In accordance with one example implementation of the present invention, the signals received by the sub-carrier diversity agent are baseband signals. That is, in accordance with one example implementation of the present invention, sub-carrier diversity agent introduces spatial diversity within a communication channel at the baseband level by modifying the received information with a set of complex weight values which affect the amplitude and phase with which such signals are transmitted from each antenna of an array of two or more antennae. The sub-carrier diversity agent then passes the weighted signals to remaining elements of the transceiver for processing, upconversion, amplification and transmission. Those skilled in the art will appreciate, given the discussion to follow, that the intra-channel spatial diversity improves the ability of a multi-carrier communication channel to withstand fading and other natural and/or unnatural channel impediments leading to poor reception at the receiver.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Example Wireless Communication System

Figure 1:
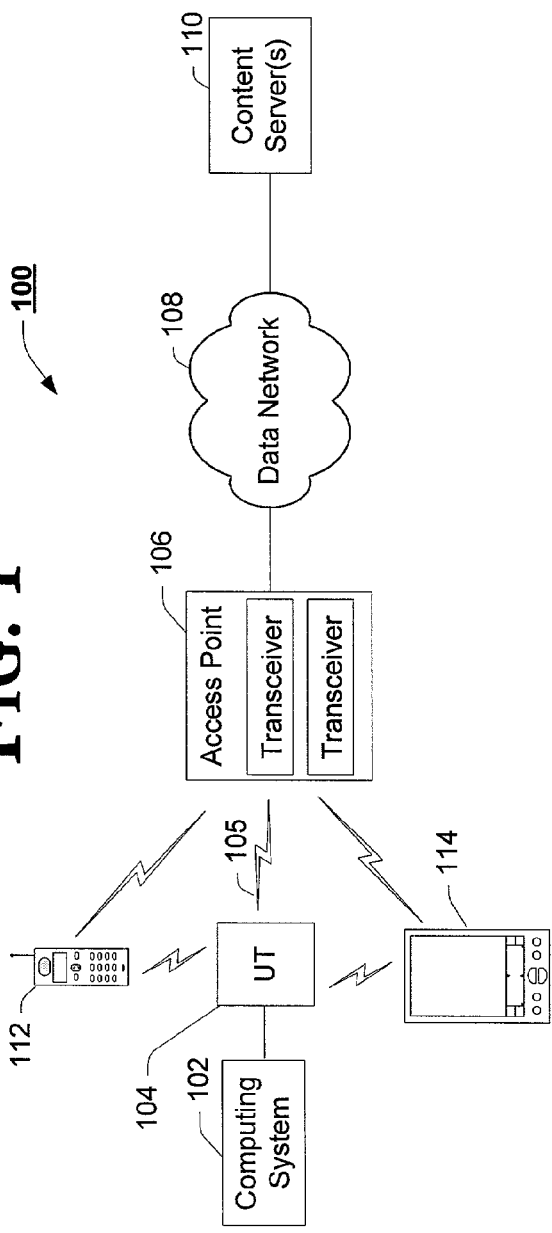
FIG. 1 is a block diagram of an example wireless communication system.

FIG. 1 provides a block diagram of an example communication system 100 in which the teachings of the present invention may well be practiced, in accordance with one example implementation of the present invention. In accordance with the illustrated example implementation of FIG. 1, communication system 100 is presented comprising one or more end-user device(s) 102, 112, 114 coupled to one another and/or content server(s) 110 of a data network through a wireless communication channel 105 to one another and/or an access point 106. While end-user devices 112, 114 are enabled with wireless communication facilities, e.g., a transceiver, computing system 102 is depicted coupled to the wireless communication system elements of the communication system 100 through user terminal 104, which is endowed with at least one transceiver to support wireless communication services on behalf of at least one communicatively coupled end-user device. Thus, in accordance with the illustrated example embodiment of FIG. 1, elements 104, 106, 112 and 114 represent a wireless communication system component of communications network 100.

According to one example implementation, the wireless communication system component is an 802.11a compliant wireless data network, facilitating the wireless exchange of data between elements via a wideband, multi-carrier wireless communication channel 105. In accordance with this example implementation, the wireless communication channel 105 is an Orthogonal Frequency Division Multiplex (OFDM) multi-carrier communication channel. Although developed in the context of the OFDM wideband communication channel, those skilled in the art will appreciate that the teachings of the present invention may well be applied to any multi-carrier wideband wireless communication channel without deviating from the spirit and scope of the present invention.

As used herein, the user terminal 104 and wireless enabled computing appliances 112 and 114 are intended to represent any of a wide variety of electronic appliances configured for wireless communications including, for example, wireless telephony subscriber units, wireless-enabled palmtop computing devices, wireless modems, and the like. In accordance with one example implementation, one or more of the user terminal 104 and/or end-user devices 112 and/or 114 are endowed with the sub-carrier diversity agent discussed more fully below, to introduce intra-channel spatial diversity within a wideband communication channel. As introduced above, the communication channel may well be established with a common access point (AP) 106, or with one another. But for the inclusion of the sub-carrier diversity agent, user terminal 104 and end-user devices 112, 114 are each intended to represent those devices as they are commonly known in the art.

Access point 106 (also referred to as a communication station and/or a basestation) is intended to represent any of a wide variety of access points known in the art. In accordance with the illustrated example of FIG. 1, access point 106 is shown comprising one or more transceivers facilitating wireless communication with one or more end-user terminals 104, and/or wireless enabled end-user devices 112, 114 within its coverage area. In accordance with the illustrated example implementation presented above, at least a subset of the transceiver(s) facilitate wireless communication using a wideband, multi-carrier communication channel, e.g., an OFDM communication channel. According to one implementation, at least a subset of such transceiver(s) are 802.11a compliant. In accordance with one example implementation of the present invention, at least a subset of the illustrated transceivers include the sub-carrier diversity agent of the present invention to introduce intra-channel spatial diversity in a wideband communication channel. But for inclusion of the sub-carrier spatial diversity agent, discussed more fully below, access point 106 is intended to represent any of a number of such devices as they are commonly known in the art.

As alluded to above, certain ones of the user terminal 104 and/or end-user devices 112, 114 may well establish a communication session between one another, e.g., without going through access point 106. In this regard, one or more of the user terminal 104, end-user device(s) 112, 114 and/or access point 106 may well include multiple antennae to fully experience the advantages of intra-channel spatial diversity. Accordingly, an example of a transceiver suitable for use in one or more of user terminal 104, end-user device(s) 112, 114 and access point 106 is presented more fully below, with reference to FIG. 2.

Example Wireless Communication System Transceiver

Figure 2:
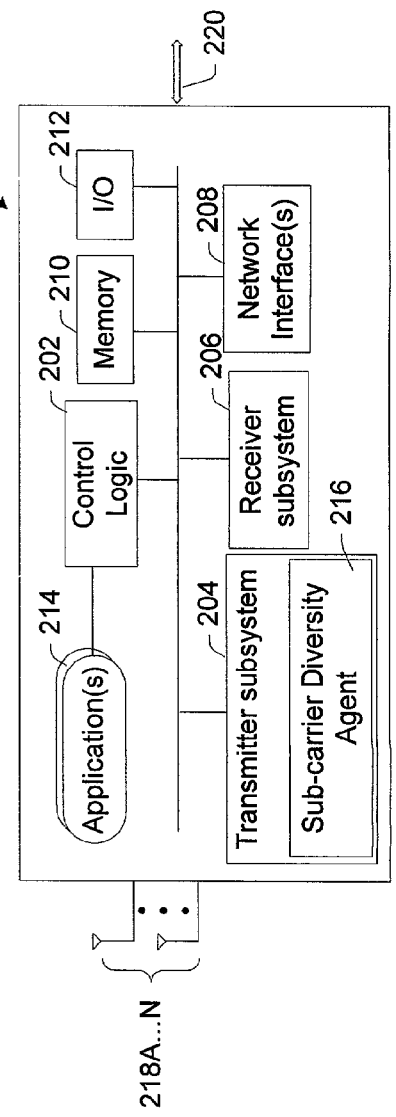
FIG. 2 is a block diagram of an example transceiver including an innovative sub-carrier diversity agent, according to one example embodiment of the present invention.

Having introduced the wireless communication system operating environment above, FIG. 2 illustrates a block diagram of an example communication system transceiver 200 incorporating an innovative sub-carrier diversity agent, in accordance with one example implementation of the present invention. In accordance with the illustrated example implementation of FIG. 2, the transceiver is depicted comprising control logic 202, a transmitter subsystem 204, a receiver subsystem 206, optional network interface(s) 208, memory 210, input/output means 212 and, application(s) 214, each coupled as shown. To facilitate wireless communication with external elements, transceiver 200 is depicted coupled with an array of two or more antenna 218A ... N. In accordance with one example implementation such as, e.g., as a user terminal (104), transceiver 200 may well be coupled to an end-user device (102) through a wireline network connection 220.

In accordance with the teachings of the present invention, to be developed more fully below, transmitter subsystem 204 is depicted comprising a sub-carrier diversity agent 216. As introduced above, sub-carrier diversity agent 216 develops transmit weight values for each of a plurality of signals associated with a corresponding plurality of sub-carriers comprising the multi-carrier communication channel transmitted by the transceiver 200. According to one implementation, introduced above, sub-carrier diversity agent develops a vector of complex-value weights ($w_1, w_2, \ldots, w_N$) to describe the relative amplitude and phase imposed on a sub-carrier sent to each transmit antenna (1-N) within an antenna array. In particular, sub-carriers bearing redundant information are modified with substantially different weights such that they are more likely to propagate distinctly and, therefore, experience decorrelated fading. In this regard, sub-carrier diversity agent 216 introduces intra-channel spatial diversity in the multi-carrier communication channel. According to one implementation, transceiver 200 supports at least OFDM wireless communication. But for inclusion of the sub-carrier diversity agent 216, transceiver 200 is intended to represent any of a wide variety of transceivers as they are commonly known in the art.

As used herein, control logic 202 controls the overall operation of the transceiver 200. In one implementation, e.g., within an access point 106, control logic 202 may well be responsive to higher-order application(s) or control logic. In alternate implementations, e.g., within a user terminal 104 or end-user device 112, 114, control logic 202 may respond to higher-order applications, control logic, or directly to user input. In either case, control logic 202 controls the communication resources of the transceiver 200 to establish wireless communication link(s) with one or more target(s) wireless communication elements. In this regard, control logic 202 is intended to represent any of a wide variety of control logic known in the art such as, for example, microprocessor(s), microcontroller(s), programmable logic device(s) (PLD), field programmable gate arrays (FPGA), and the like. Alternatively, control logic 202 may well be content which, when executed by a computing appliance, implement the control features described herein.

Applications 214 are intended to denote any of a plurality of content which is executable by control logic 202 to perform some function. In this regard, applications 214 may well represent a series of executable instructions which, when executed, endow transceiver 200 with wireless communication features, or provide a wireless communication protocol to the transceiver 200. In alternate implementations, aspects of the sub-carrier diversity agent 216 are embodied as a series of executable instructions and are, in such an implementation, denoted herein generally as applications 214. It will be apparent that the teachings of the present invention may well be practiced without such applications 214.

Transmitter subsystem 204 develops a wireless communication channel for transmission to target wireless communication devices through two or more antennae 218. In accordance with the illustrated example implementation, transmitter module 204 includes resources to facilitate generation of a wideband, multi-carrier communication channel(s) such as, for example, an OFDM wideband, multicarrier communication channel. In accordance with the teachings of the present invention, developed more fully below, transmitter subsystem 204 utilizes a sub-carrier diversity agent 216 to introduce intra-channel spatial diversity within the wideband communication channel.

It should be appreciated that, although depicted residing within transmitter subsystem 204, alternate implementations of sub-carrier diversity agent 216 are envisioned wherein it is not integrated within the transmitter subsystem itself, but merely utilized by the transmitter subsystem. The illustrated implementation of FIG. 2 is merely intended to represent the relationship of these two elements. A more detailed description of an example transmitter subsystem 204 is presented below, with reference to FIG. 3.

Receiver module 206 receives a transmitted signal via antennae 218 and processes the received signal to produce a substantial representation of the transmitted information, which is provided to an input/output device (not shown) via control logic 202 or a communicatively coupled end-user device. In accordance with the example implementation denoted above, receiver module 206 supports the downconversion, digital transform (e.g., through a fast-Fourier transform) and demodulation of a wideband, OFDM communication channel.

Network interface(s) 208 enable transceiver 200 to interface with wireline network elements, e.g., with an end-user device 102. In this regard, network interface(s) 208 enables transceiver 200 to facilitate wireless communication services on behalf of computing appliance.

Memory 210 is also intended to represent any of a wide variety of memory and/or storage devices known in the art. According to one implementation, memory 210 is intended to represent a memory system including a memory controller and one or more volatile and non-volatile memory devices (not specifically denoted). According to one implementation, to be developed more fully below, memory 210 maintains a data structure comprising spatial signature information associated with each of the sub-carriers of the wideband communication channel for each of the antennae 218. Memory 210 may also be used in support of other communication resources and/or applications 214 of transceiver 200.

Input/Output module 212 includes one or more of a alpha-numeric keypad, speaker and/or microphone and is found, for example, in an implementation of an end-user device 112, 114. That is, such I/O 212 resources are found in implementations wherein the transceiver directly supports user interaction.

Those skilled in the art will appreciate, given the foregoing, that sub-carrier diversity agent 216 is particularly useful in that it introduces spatial diversity within a wideband communication channel. Moreover, as will be developed more fully below, such spatial diversity is introduced at the basesband. It will be appreciated that such intra-channel spatial diversity provides a wideband communication channel that is much more resilient to fading and other transmission impediments.

Example Transmitter Subsystem

Figure 3:
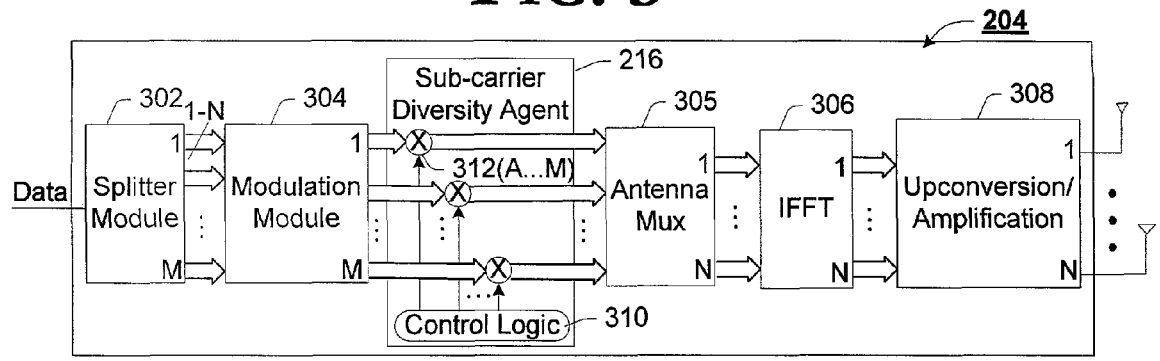
FIG. 3 is a block diagram of an example transceiver subsystem having an example sub-carrier diversity agent, according to one example embodiment of the present invention.

Turning next to FIG. 3, an example transmitter subsystem is presented, in accordance with one example implementation of the present invention. In accordance with the example implementation presented herein, transmitter subsystem 204 receives content and generates a wideband, multi-carrier wireless communication channel with which to transmit to a target wireless communication system element. In accordance with the illustrated example implementation of FIG. 3, transmitter subsystem 204 is presented comprising a splitter module 302, a modulation module 304, the sub-carrier diversity agent 216 of the present invention, an antenna multiplexer 305, a digital transform engine 306, and an upconversion and amplification stage 308, each coupled as depicted.

As used herein, the splitter module 302 receives a data signal and splits the signal into M-subcarriers. For each of the M-subcarriers, splitter module 302 further splits the signal into N signals, one for each antenna path (1-N). Once split, each of the signals are passed through modulation module 304, which digitally modulates the received content in accordance with the modulation scheme employed by the wireless communication system. According to one example implementation, modulation module 304 employs quadrature phase shift-keying (QPSK) modulation of the received content. Any of a number of alternate modulation schemes may well be employed, however, such as, for example, quadrature amplitude modulation (QAM), binary phase shift-keying (BPSK), and the like. According to one example implementation, modulation module 302 also performs convolutional coding and interleaving, producing a plurality of signals, each comprising at least a subset of content that is selectively redundant with other such signals. According to one example implementation, the generated signals are baseband signals.

As shown, sub-carrier diversity agent 216 accepts the M sub-carrier baseband signals and modifies the signals with a unique transmit weighting value(s). More particularly, as introduced above, sub-carrier diversity agent 216 receives the baseband signals (1-M) and multiplies the signals by a dynamically generated set of complex weight vectors ($w_1$, $w_2$, ..., $w_N$) which effectively modify one or more of amplitude and/or phase characteristics at the transmit antenna (1-N) of an antenna array. In this regard, sub-carrier diversity agent introduces intra-channel spatial diversity in a wideband, multi-carrier communication channel.

In accordance with the illustrated example implementation, sub-carrier diversity agent 216 is presented comprising control logic 310, which develops the set of complex weighting values to be applied to each of the signals. According to one example implementation, a complex weight value to modify, e.g., the amplitude and/or phase of the signal, is developed for each antenna. That is, if the complex-valued baseband signal of a sub-carrier (i) is s(i), then the signal transmit from antenna (j) is weighted with a complex-valued weight w(i,j) and the baseband signal transmit from antenna (j) may be represented as:

$$w(i,j)*s(i) \quad (1)$$

Thus, for each sub-carrier (i), the vector of weights:

$$(w(i,1), w(i,2), \ldots, w(i,N)) \quad (2)$$

where N is the number of antennae in the array, will determine a unique beampattern of the sub-carrier when transmitted from the antenna array. Accordingly, once the weight vector is developed for a given baseband signal, it is applied to the baseband signal as depicted. According to one example implementation, sub-carrier diversity agent 216 digitally multiplies 312 the baseband signal by the complex weight values In accordance with an alternate implementation of, for example, analog signals, the baseband signal is multiplied by the complex weight value(s) using a mixer (e.g., 312).

By choosing a different vector of weights for each of the baseband signals (1-M), control logic 310 causes each sub-carriers sharing convolutionally encoded information and, therefore, partially redundant to be transmitted with a different beampattern from one another. Each such beampattern propagates differently and, as a result, intra-channel spatial diversity is introduced within the wideband communication channel.

As used herein, control logic 310 may well use any of a number of techniques to develop the distinct transmit weights applied to a sub-carrier. According to one example implementation, for example, control logic 310 arbitrarily chooses a vector for a first of such signals, and subsequently steps through the remaining signals in an iterative fashion applying a vector to subsequent signals that is maximally orthogonal to signals adjacent to the subsequent signals. According to an alternate implementation, control logic 310 applies arbitrary weight vector(s) chosen from a pre-determined set, the number in the set determined by the interleaving depth (i.e., the number of sub-carriers bearing the same redundant information), and applied in such a way that the sub-carriers bearing redundant information receive different weight vectors. According to yet another alternate implementation, control logic 310 applies weight vectors that are sufficiently different from weight vectors modifying subcarriers sharing convolutionally encoded information, where substantially different weight vectors are selected to satisfy the following:

$$\_|w_i'^* w_j|/(abs(w_i)*abs(w_j)) < THRESH, \text{ where } THRESH < 1.$$

Regardless of the method employed, control logic 310 maintains the set of weight vectors in a data structure such as, for example, the one referenced below in FIG. 4.

Once sub-carrier diversity agent 216 has introduced intra-channel spatial diversity, the weighted baseband signals 1-M are passed to multiplexer 305, wherein subcarrier elements (1-M) associated with a particular antenna (1-N) are multiplexed together and applied to a digital transform 306. According to one example implementation, the digital transform is an Fourier-type transformation (wherein the receiver implements the inverse of the transform employed in the transmitter). In accordance with the illustrated implementation, digital transform 306 employs a fast-Fourier transform, while a receiving entity would thus employ an inverse FFT. In this regard, each of the sub-carrier signals (1-M) associated with a particular antenna (1-N) are transformed together, on a symbol-by-symbol basis. Each of these transformed signals are then passed through an upconversion and/or amplification stage 308 before transmission via associated antenna (1-N).

Example Data Structure(s)

Figure 4:
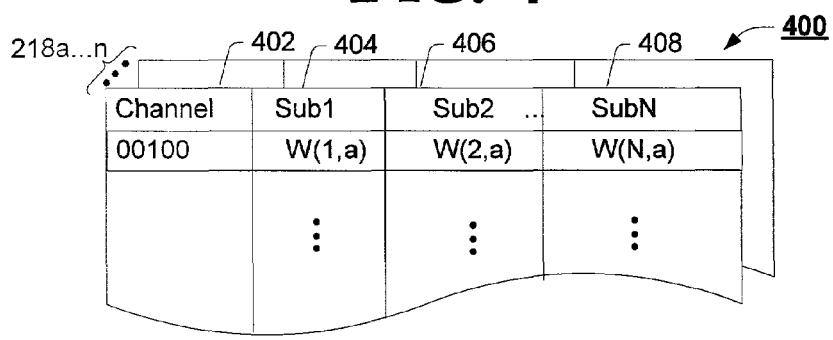
FIG. 4 illustrates an example data structure for maintaining intra-channel spatial signature information, according to one example implementation of the present invention.

FIG. 4 graphically illustrates an example data structure for maintaining intra-channel spatial signature information, in accordance with one example implementation of the present invention. In accordance with the illustrated example implementation of FIG. 4, a data structure 400 is presented comprising a channel identification field 402 followed by a number of sub-carrier spatial signature fields 404-408. Each of the sub-carriers carry a weight vector for each of antennae 218A...N. Thus, the weight vector depicted conforms to the following format:

$$W(\text{sub-carrier\_ID, antenna\_ID}) \quad (3)$$

As used herein, the size and complexity of the data structure(s) used to implement the aforementioned intra-channel spatial diversity features may well vary from that depicted without deviating from the spirit and scope of the present invention.

Example Implementation and Operation

Having introduced the operational and architectural elements of the present invention, above, reference is next directed to FIG. 5, wherein an example method of introducing intra-channel spatial diversity is presented, in accordance with the teachings of the present invention.

FIG. 5 illustrates a flow chart of an example method for generating a wideband communication channel, in accordance with teachings of the present invention. That is, FIG. 5 illustrates an example method for introducing intra-channel spatial diversity in a wideband wireless communication channel, in accordance with the teachings of the present invention. As shown, the illustrated example method begins with block 502 wherein a transmitter subsystem 204 receives content for processing and wireless transmission over a multi-carrier wireless communication channel. In block 504, the content is split into M-subcarriers and each sub-carrier is further split 302 for processing along N antenna paths, thus yielding N versions of M sub-carriers, some of which comprising selectively redundant subsets of the received content. Once the received content is split into N versions of the M sub-carriers, each of the signals is applied to modulation module 304, which digitally modulates the received content As introduced above, modulation module 304 digitally each of the sub-carriers using QPSK modulation.

In block 506, the digitally modulated signals are passed to sub-carrier diversity agent 216, which modifies the baseband signals with a set of complex weights, which effectively modify one or more signal attributes at each of the transmission antennae (1-N). According to one example implementation, such baseband signals are passed to sub-carrier diversity agent 216 wherein controller 310 develops the set of complex weight vectors associated with each of the antennae (1-N) and applies the weight vector to the baseband signals (1-M). As introduced above, control logic 310 may well employ any of a number of techniques to generate a set of weight vectors which are applied to the baseband signals.

In block 506, the weighted signals are multiplexed 305 according to transmission path (e.g., combine each of the sub-carrier elements (1-M) corresponding to individual ones of the antennae (1-N) and passed through a digital transform (e.g., FFT 306) before one or more of upconversion and amplification 308 to complete transmission processing, whereupon the wideband communication channel with intra-channel spatial diversity is transmitted to one or more receiver(s).

According to one example implementation, not particularly depicted, implementations comprising multiple transceiver(s) (e.g., access point 106) may also utilize inter-channel spatial diversity using any of a number of known techniques. In this regard, a communication system employing intra-channel and inter-channel spatial diversity is envisioned which beneficially utilizes spatial diversity within and between the communication channels of the wideband communication system.

Alternate Embodiment(s)

Figure 6:
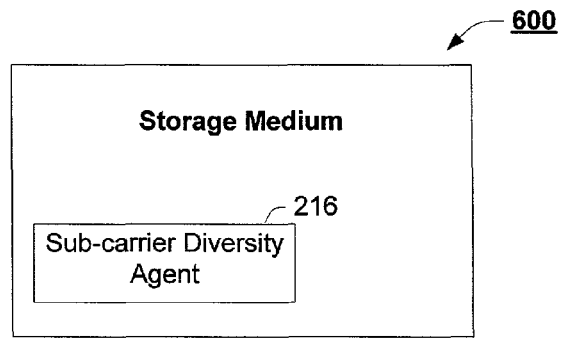
FIG. 6 is a block diagram of an example storage medium comprising a plurality of executable instructions which, when executed, cause an accessing machine to implement one or more aspects of the innovative communication agent of the present invention, in accordance with an alternate embodiment of the present invention.

FIG. 6 is a block diagram of an example storage medium comprising a plurality of executable instructions which, when executed, cause an accessing machine to implement one or more aspects of the innovative sub-carrier diversity agent 216 of the present invention, in accordance with an alternate embodiment of the present invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1, 2 and/or 3, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, any steps described as being performed by the base station may be performed by the user terminal and vice versa. The invention is equally applicable to transceivers and/or systems in which terminals communicate with each other without either one being designated as a base station, a user terminal, a remote terminal or a subscriber station. The invention can further be applied to a network of peers.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a wireless communication system for portable handsets, it can be applied to a wide variety of different wireless systems in which data are exchanged. Such systems include voice, video, music, broadcast and other types of systems without external connections. The present invention can be applied to fixed remote terminals as well as to low and high mobility terminals. Many of the methods are described in their most basic form but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:
receiving information in the form of a data signal for transmission to a receiver;
storing the information in a memory;
splitting the data signal into a plurality of sub-carriers to at least partially redundantly transmit the information over a multi-carrier wireless communication channel using a splitter module;
splitting each of the sub-carriers into N signals one for each of a plurality of antenna paths, wherein each of the sub-carriers is to be transmitted over an array of N antennas using a different antenna path for each signal using a second splitter module; and
modifying each of the sub-carriers by a set of complex weights, the sets of complex weights having a complex weight for each antenna path, to ensure that each of the N signals of each sub-carrier of the wireless communication channel propagates along a different physical path to the receiver, wherein the set of complex weights used to modify each of the sub-carriers includes different weights for each antenna path of the array,
wherein the modifying is performed by control logic coupled to the memory, operable to access and process at least a subset of the information to implement diversity transmission.

2. A method according to claim 1, wherein each element of the set of complex weights scales one or more of a sub-carrier's amplitude and phase at an associated transmission antenna.

3. A method according to claim 1, further comprising developing a set of complex weights including:
choosing substantially different weights for each sub-carrier sharing information; and
iteratively repeating until all sub-carriers have been modified.

4. A method according to claim 3, wherein the substantially different weights are chosen to be orthogonal to the others.

5. A method according to claim 3, wherein developing a set of complex weights comprises:
selecting weight vector(s) to be applied to each of the sub-carriers from a pre-determined set of weight vectors.

6. A method according to claim 1, further comprising:
transmitting the modified sub-carriers.

7. The method of claim 1, wherein the multi-carrier wireless communication channel uses Orthogonal Frequency Division Multiplexing (OFDM).

8. A transceiver comprising:
a splitter module, operable to receive a data signal for transmission to a receiver, to split the data signal into a plurality of sub-carriers to at least partially redundantly transmit the information over a multi-carrier wireless communication channel and to split each of the sub-carriers into N signals one for each of a plurality of antenna paths, wherein each of the sub-carriers is to be transmitted over an array of N antennas using a different antenna path for each signal;
a diversity agent, operable to selectively apply a set of complex weight values to each of the sub-carriers, the sets of complex weights having a complex weight for each antenna path, to introduce spatial diversity between such sub-carriers;
a memory operable to store content;
control logic, coupled to the memory, operable to access and process at least a subset of the content to implement the diversity agent; and
a transmit module, coupled with the diversity agent, operable to receive the modified sub-carriers and transmit the signals to generate the multi-carrier communication channel with intra-channel spatial diversity, wherein each of the set of complex weight values include a plurality of weight values each associated with a different one of a plurality of antenna paths of an antenna array through which the sub-carriers are transmitted.

9. A transceiver according to claim 8, wherein the plurality of signals are baseband signals.

10. A transceiver according to claim 8, wherein the multi-carrier communication channel is comprised of a plurality of sub-carrier signals, each having a disparate set of complex weights introduced at a baseband of the sub-carriers to effect the spatial diversity between the sub-carriers.

11. A transceiver according to claim 8, wherein the transceiver is operable to develop the set of complex weight values for a given baseband signal to be maximally orthogonal complex weight values applied to another baseband signal.

12. A transceiver according to claim 8, wherein the transceiver is operable to develop a set of complex weight vectors for a sub-carrier that are substantially different from weight vectors modifying other sub-carriers that include at least a subset of information carried by the sub-carrier.

13. A transceiver according to claim 8, wherein the transmit module is operable to upconvert and amplify each of the modified baseband signals to generate a plurality of spatially diverse sub-carriers.

14. A transceiver according to claim 13, wherein the transmit module is operable to transmit each of the sub-carriers to one or more receiver(s).

15. The transceiver of claim 8, wherein the multi-carrier communication channel uses Orthogonal Frequency Division Multiplexing (OFDM).

16. The transceiver of claim 8, wherein the transceiver is selected from a basestation and a wireless telephony subscriber unit.

17. The transceiver of claim 8, wherein the transceiver develops the set of complex weights to have inter-channel spatial diversity with respect to at least one communication channel of at least one other transceiver.

18. A transceiver according to claim 8, wherein each of the set of complex weight values are comprised of a plurality of weight values each associated with one of a plurality of antennae of an antenna array through which the sub-carriers are transmitted.

19. A subscriber unit comprising:
a splitter module, operable to receive a data signal for transmission to a receiver, to split the data signal into a plurality of sub-carriers to at least partially redundantly transmit the information over a multi-carrier wireless communication channel and to split each of the sub-carriers into N signals one for each of a plurality of antenna paths, wherein each of the sub-carriers is to be transmitted over an array of N antennas using a different antenna path for each signal;
a diversity agent, operable to selectively apply a vector of complex weight values to each of the plurality of sub-carriers to introduce spatial diversity between such sub-carriers, wherein the vectors of complex weight values applied to each signal includes a plurality of different complex weight values, and wherein each of the different complex weight values is operable to modify both an amplitude and a phase of a respective signal;
a memory operable to store content;
control logic, coupled to the memory, operable to access and process at least a subset of the content to implement the diversity agent; and
a transmit module, coupled with the diversity agent, operable to receive the modified sub-carriers and transmit the signals through the antenna paths to generate the multi-carrier communication channel with intra-channel spatial diversity.

20. A device comprising:
a splitter module, operable to receive a data signal for transmission to a receiver, to split the data signal into a plurality of sub-carriers to at least partially redundantly transmit the information over a multi-carrier wireless communication channel and to split each of the sub-carriers into N signals one for each of a plurality of antenna paths, wherein each of the sub-carriers is to be transmitted over an array of N antennas using a different antenna path for each signal;
a diversity agent, operable to selectively apply a vector of complex weight values to each of the plurality of sub-carriers to introduce spatial diversity between such sub-carriers, wherein the vector of complex weight values applied to each signal includes a plurality of different complex weight values, and wherein each of the different complex weight values is operable to modify both an amplitude and a phase of a respective signal;
a memory operable to store content;
control logic, coupled to the memory, operable to access and process at least a subset of the content to implement the diversity agent; and
a transmit module, coupled with the diversity agent, operable to receive the modified sub-carriers and transmit the signals through the antenna paths to generate the multi-carrier communication channel with intra-channel spatial diversity.

* * * * *